US011433949B2

(12) United States Patent
Okamura et al.

(10) Patent No.: US 11,433,949 B2
(45) Date of Patent: Sep. 6, 2022

(54) BODY OF ELECTRIC VEHICLE

(71) Applicants: TOYOTA JIDOSHA KABUSHIKI KAISHA, Aichi (JP); SUBARU CORPORATION, Tokyo (JP)

(72) Inventors: Junya Okamura, Tokyo-to (JP); Ryo Kimura, Tokyo-to (JP)

(73) Assignees: TOYOTA JIDOSHA KABUSHIKI KAISHA, Aichi-Ken (JP); SUBARU CORPORATION, Tokyo (JP)

( * ) Notice: Subject to any disclaimer, the term of this patent is extended or adjusted under 35 U.S.C. 154(b) by 56 days.

(21) Appl. No.: 17/031,901

(22) Filed: Sep. 25, 2020

(65) Prior Publication Data

US 2021/0094625 A1    Apr. 1, 2021

(30) Foreign Application Priority Data

Sep. 26, 2019  (JP) ............... JP2019-176106

(51) Int. Cl.
*B60K 1/04*      (2019.01)
*B62D 25/20*    (2006.01)
*B60L 50/60*    (2019.01)

(52) U.S. Cl.
CPC ............ *B62D 25/2036* (2013.01); *B60K 1/04* (2013.01); *B62D 25/2027* (2013.01); *B60K 2001/0438* (2013.01); *B60L 50/66* (2019.02)

(58) Field of Classification Search
CPC ... B60K 1/04; B62D 25/2036; B62D 25/2027
See application file for complete search history.

(56) References Cited

U.S. PATENT DOCUMENTS 10,272,759 B2 *  4/2019  Sudhindra ............... B60L 50/66
2019/0061830 A1   2/2019  Fujisawa et al.

FOREIGN PATENT DOCUMENTS

JP           201938482 A      3/2019

* cited by examiner

*Primary Examiner* — Jonathan Ng
*Assistant Examiner* — James J Triggs
(74) *Attorney, Agent, or Firm* — Hauptman Ham, LLP

(57) ABSTRACT

A body of an electric vehicle may include: a floor panel; a pair of rockers extending along both side edges of the floor panel, respectively; an indoor floor crossmember protruding upward from the floor panel and connecting the rockers to each other; an outdoor floor crossmember protruding downward from the floor panel, connecting the rockers to each other, and located rearward of the indoor floor crossmember; and a battery case located below the floor panel and housing a battery configured to supply power to a traction motor. The battery case may extend from a position located frontward of the indoor floor crossmember to a position that is located rearward of the indoor floor crossmember and frontward of the outdoor floor crossmember.

7 Claims, 8 Drawing Sheets

BODY OF ELECTRIC VEHICLE

CROSS-REFERENCE

This application claims priority to Japanese Patent Application No. 2019-176106 filed on Sep. 26, 2019, the contents of which are hereby incorporated by reference into the present application.

TECHNICAL FIELD

The technique disclosed herein relates to a body of an electric vehicle. In the disclosure herein, the electric vehicle means a vehicle configured to travel using electric power stored in a battery. The electric vehicle includes electric cars, hybrid cars, fuel cell cars, etc.

BACKGROUND

Japanese Patent Application Publication No. 2019-038482 describes a body of an electric vehicle. This body includes a floor panel (a front floor panel and a rear floor panel) that constitutes a floor of cabin. A crossmember (which will be termed an indoor crossmember) that protrudes upward from the floor panel and extends in a right-left direction is disposed on an upper surface of the floor panel. A rear crossmember that protrudes downward from the floor panel and extends in the right-left direction is disposed on a lower surface of the floor panel. The rear crossmember is located rearward of the indoor crossmember. A battery case is disposed below the floor panel. The battery case houses a battery configured to supply electric power to a traction motor. The battery case extends from a position located forward of the indoor crossmember to a position that is located rearward of the indoor crossmember and forward of the rear crossmember. Disposing the rear crossmember rearward of the indoor crossmember and permitting the battery case to extend in a space therebetween enables a size increase of the battery case. A capacity of the battery can thereby be increased.

SUMMARY

In the body of Japanese Patent Application Publication No. 2019-038482, right and left ends of the rear crossmember are connected to a rear side frame (which may be referred to as a rear side member). This structure has room for improvement regarding protection of the battery in the event of a lateral collision to the vehicle.

A body of an electric vehicle disclosed herein may comprise a floor panel; a pair of rockers extending along both side edges of the floor panel, respectively; an indoor floor crossmember protruding upward from the floor panel and connecting the rockers to each other; an outdoor floor crossmember protruding downward from the floor panel, connecting the rockers to each other, and located rearward of the indoor floor crossmember; and a battery case located below the floor panel and housing a battery configured to supply power to a traction motor. The battery case may extend from a position located forward of the indoor floor crossmember to a position that is located rearward of the indoor floor crossmember and forward of the outdoor floor crossmember.

In this body, the battery case located below the floor panel extends from a position located forward of the indoor floor crossmember to a position located rearward of the indoor floor crossmember and forward of the outdoor floor crossmember. This allows the battery case to house a battery with high capacity. Further, in this body, the indoor floor crossmember and the outdoor floor crossmember both connect the rockers to each other. The rockers, the outdoor floor crossmember, and the indoor floor crossmember constitute a frame, and this frame is highly rigid. Thus, if a lateral collision to the vehicle occurs, the frame is less likely to be deformed and deformation of the battery case is thereby mitigated. As such, this body can suitably protect the battery in the event of a lateral collision to the vehicle.

DETAILED DESCRIPTION

Figure 1:
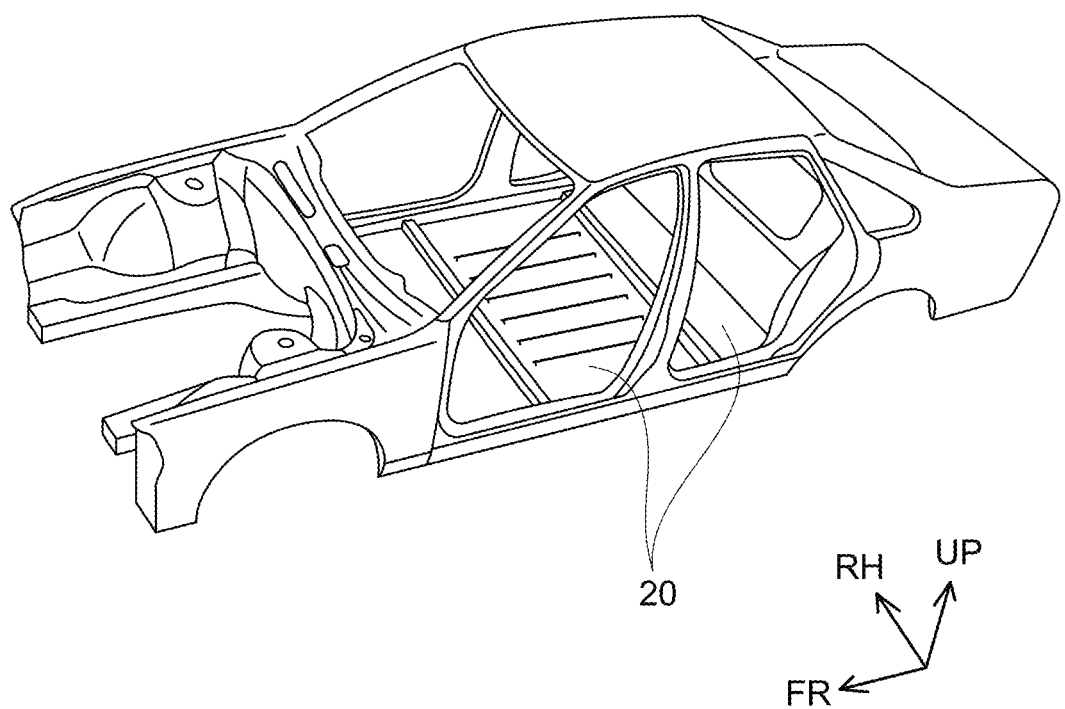
FIG. 1 is a perspective view of a body 10 of an electric vehicle.

A traction motor is mounted on an electric vehicle of an embodiment. The electric vehicle travels by having the traction motor driving its wheels. FIG. 1 shows a body 10 of the electric vehicle of the embodiment. The body 10 includes a floor panel 20. The embodiment to be described hereinbelow relates to a rear portion of the floor panel 20 and a surrounding structure around the rear portion. In the drawings including FIG. 1, an arrow FR indicates a front direction of the vehicle, an arrow RH indicates a right direction of the vehicle, and an arrow UP indicates an up direction of the vehicle.

Figure 2:
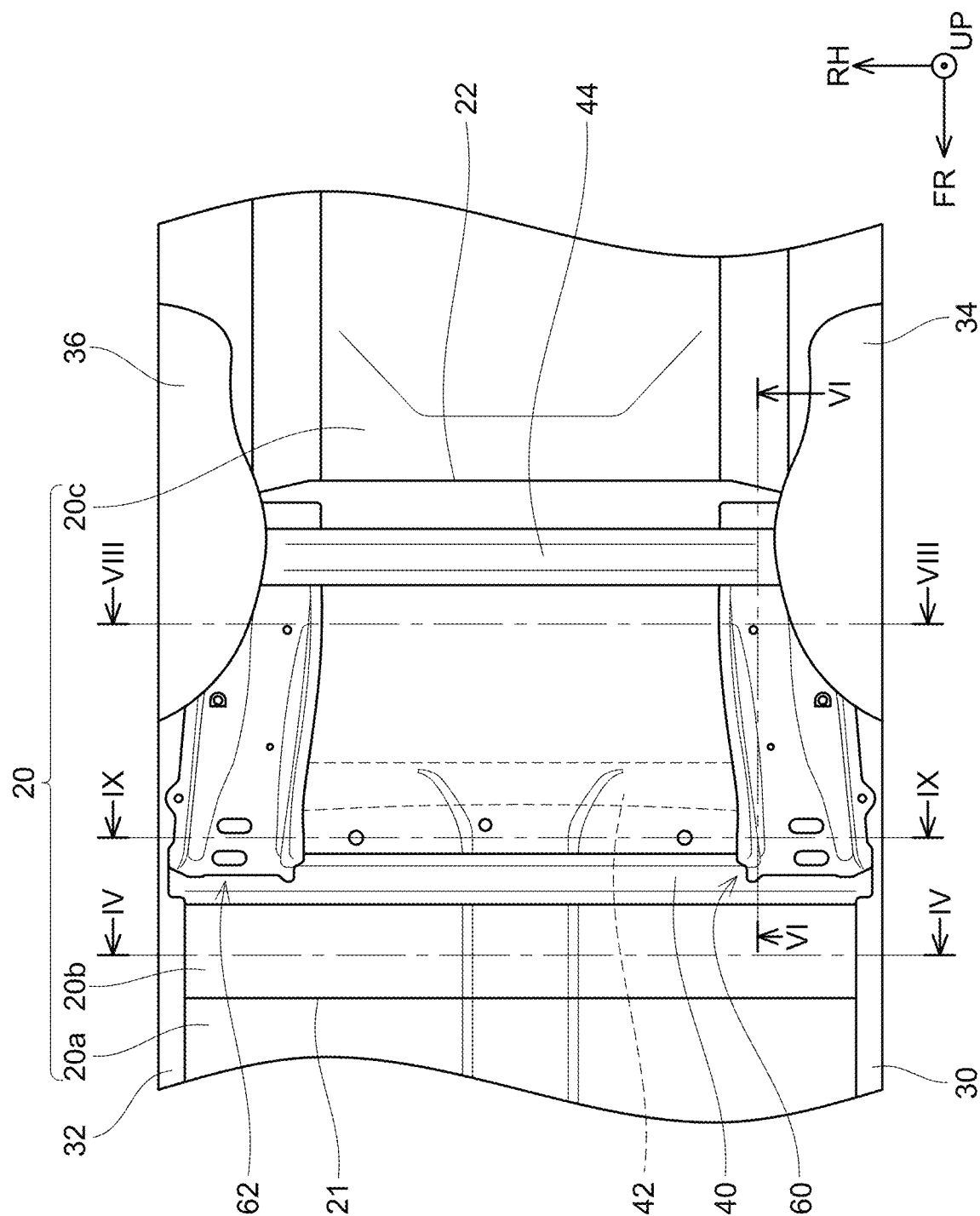
FIG. 2 is a planar view of an underbody from above.
Figure 3:
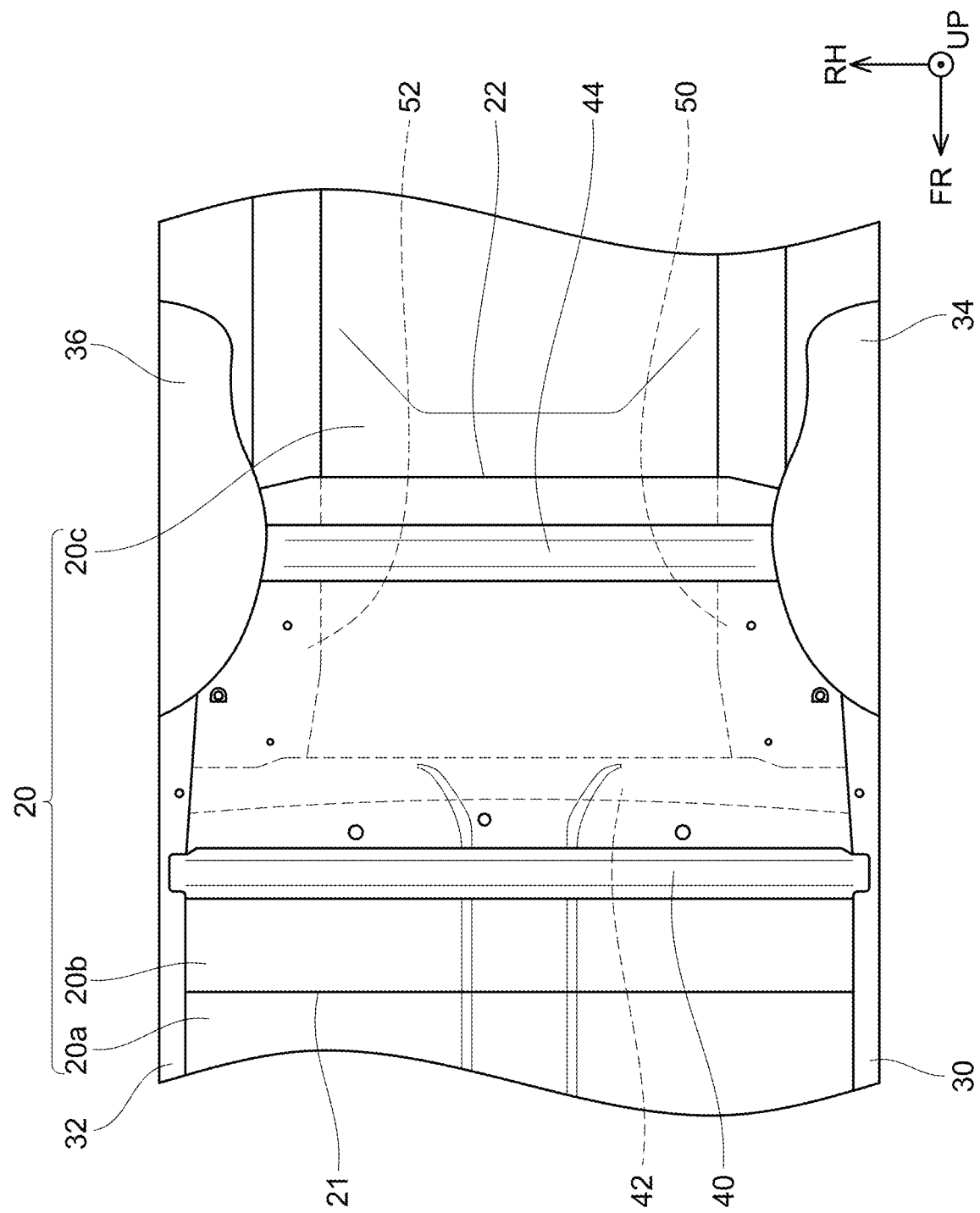
FIG. 3 is a planar view corresponding to FIG. 2, with reinforcements 60, 62 omitted.

FIGS. 2 and 3 each show a planar view of an underbody of the body 10 from above. The planar view of FIG. 2 includes reinforcements 60, 62 disposed on the floor panel 20, while the reinforcements 60, 62 are removed in the planar view of FIG. 3.

As shown in FIGS. 2 and 3, the floor panel 20 includes a front floor panel 20a, a rear floor panel 20b, and a luggage floor panel 20c. From the front to rear of the vehicle, the front floor panel 20a, the rear floor panel 20b, and the luggage floor panel 20c are arranged in this order. Each of the front floor panel 20a, the rear floor panel 20b, and the luggage floor panel 20c consists of a single steel plate (a single plate). A front edge 21 of the rear floor panel 20b is welded to the front floor panel 20a. A rear edge 22 of the rear floor panel 20b is welded to the luggage floor panel 20c. That is, the rear floor panel 20b constitutes a portion of the floor panel 20 between the front edge 21 to the rear edge 22. The front floor panel 20a and the rear floor panel 20b constitute a cabin floor. The luggage floor panel 20c constitutes a luggage space floor.

Figure 4:
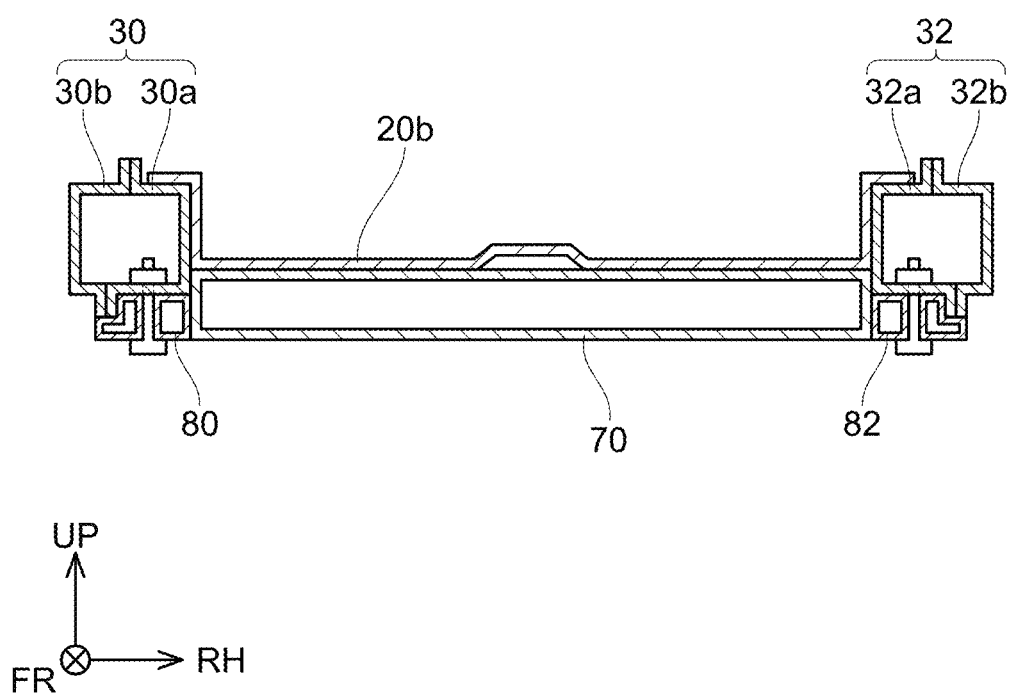
FIG. 4 is a cross-sectional view of the underbody along a line IV-IV in FIG. 2.

As shown in FIGS. 2 and 3, a pair of rockers (a left rocker 30 and a right rocker 32) is disposed at both of side edges of the floor panel 20, respectively. FIG. 4 shows a cross-sectional view of the underbody cut at a position including the left rocker 30 and the right rocker 32 (at a position of line IV-IV in FIG. 2). As shown in FIG. 4, the left rocker 30 includes an rocker innerinner rocker 30a and an rocker outerouter rocker 30b. Each of the rocker innerinner rocker 30a and the rocker outerouter rocker 30b is an elongated member having a U-shaped cross section, and extends long in a front-rear direction. The rocker innerinner rocker 30a and the rocker outerouter rocker 30b are assembled and welded to each other such that they form an inner space. Thus, the left rocker 30 has a hollow prism shape and extends long in the front-rear direction. As shown in FIGS. 2 and 3, the left rocker 30 is arranged along the left edge of the floor panel 20. The left rocker 30 is joined to the front floor panel 20a and the rear floor panel 20b, for example, by welding. As shown in FIG. 4, the right rocker 32 includes an rocker innerinner rocker 32a and an rocker outerouter rocker 32b joined to each other, similar to the left rocker 30. The right rocker 32 has a hollow prism shape and extends long in the front-rear direction. As shown in FIGS. 2 and 3, the right rocker 32 is arranged along the right edge of the floor panel 20. The right rocker 32 is joined to the front floor panel 20a and the rear floor panel 20b, for example, by welding.

As shown in FIGS. 2 and 3, a pair of wheel house panels (a left wheel house panel 34 and a right wheel house panel 36) is disposed at both of the side edges of the floor panel 20, respectively. The left wheel house panel 34 is fixed to the left edge of the floor panel 20 at a position rearward of the left rocker 30. The left wheel house panel 34 is a concavely curved plate and is fixed to the floor panel 20 with the concave portion facing outward and downward. The concave portion of the left wheel house panel 34 houses a left rear tire, for example. The left wheel house panel 34 is joined to the rear floor panel 20b and the like, for example, by welding. The right wheel house panel 36 is fixed to the right edge of the floor panel 20 at a position rearward of the right rocker 32. The right wheel house panel 36 is a concavely curved plate and is fixed to the floor panel 20 with the concave portion facing outward and downward. The concave portion of the right wheel house panel 36 houses a right rear tire, for example. The right wheel house panel 36 is joined to the rear floor panel 20b and the like, for example, by welding.

As shown in FIGS. 2 and 3, an indoor floor crossmember 40 and a rear floor crossmember 44 are disposed on an upper surface of the rear floor panel 20b.

Figure 5:
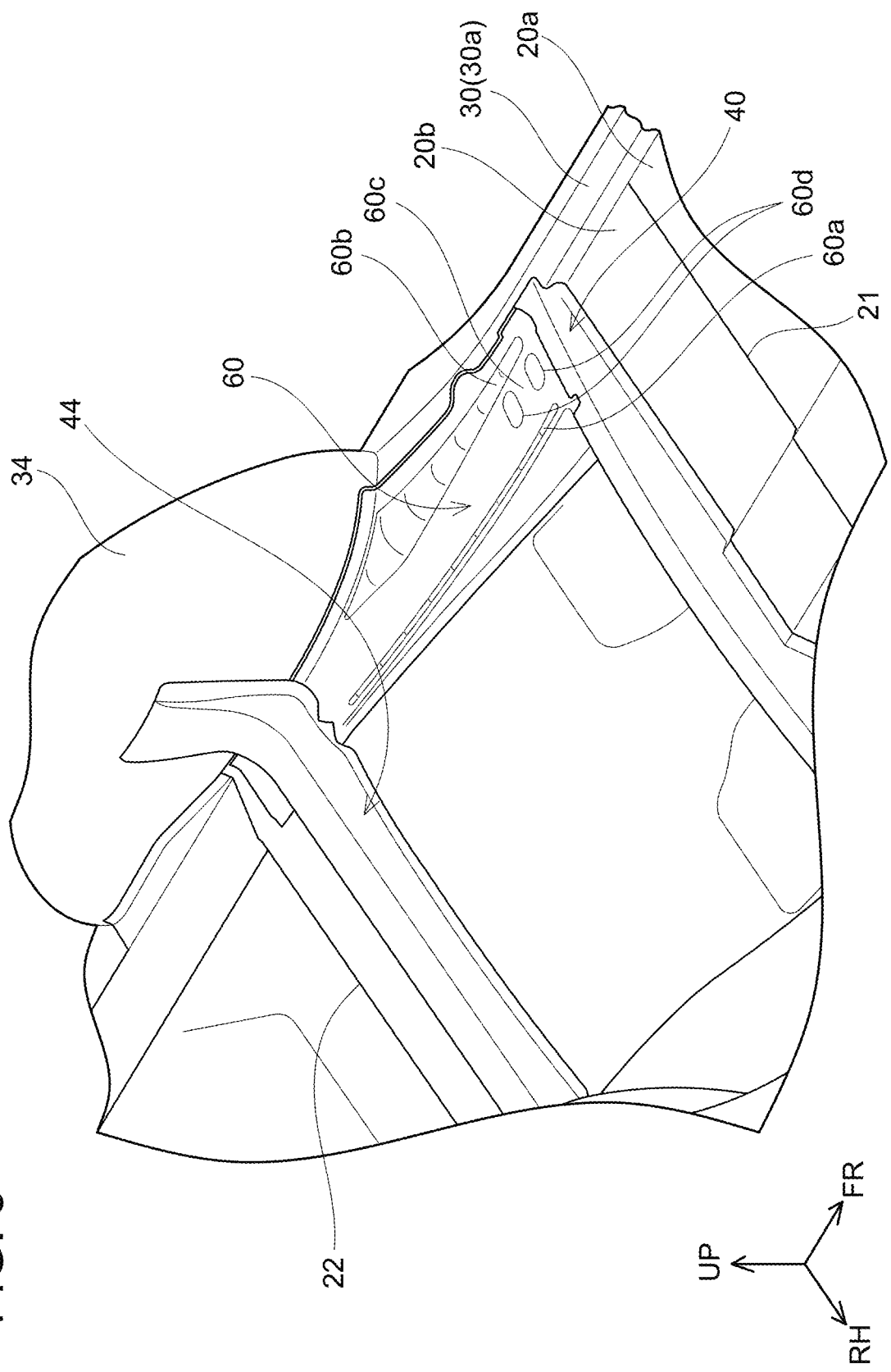
FIG. 5 is a perspective view of an area around a left reinforcement 60 from obliquely above.
Figure 6:
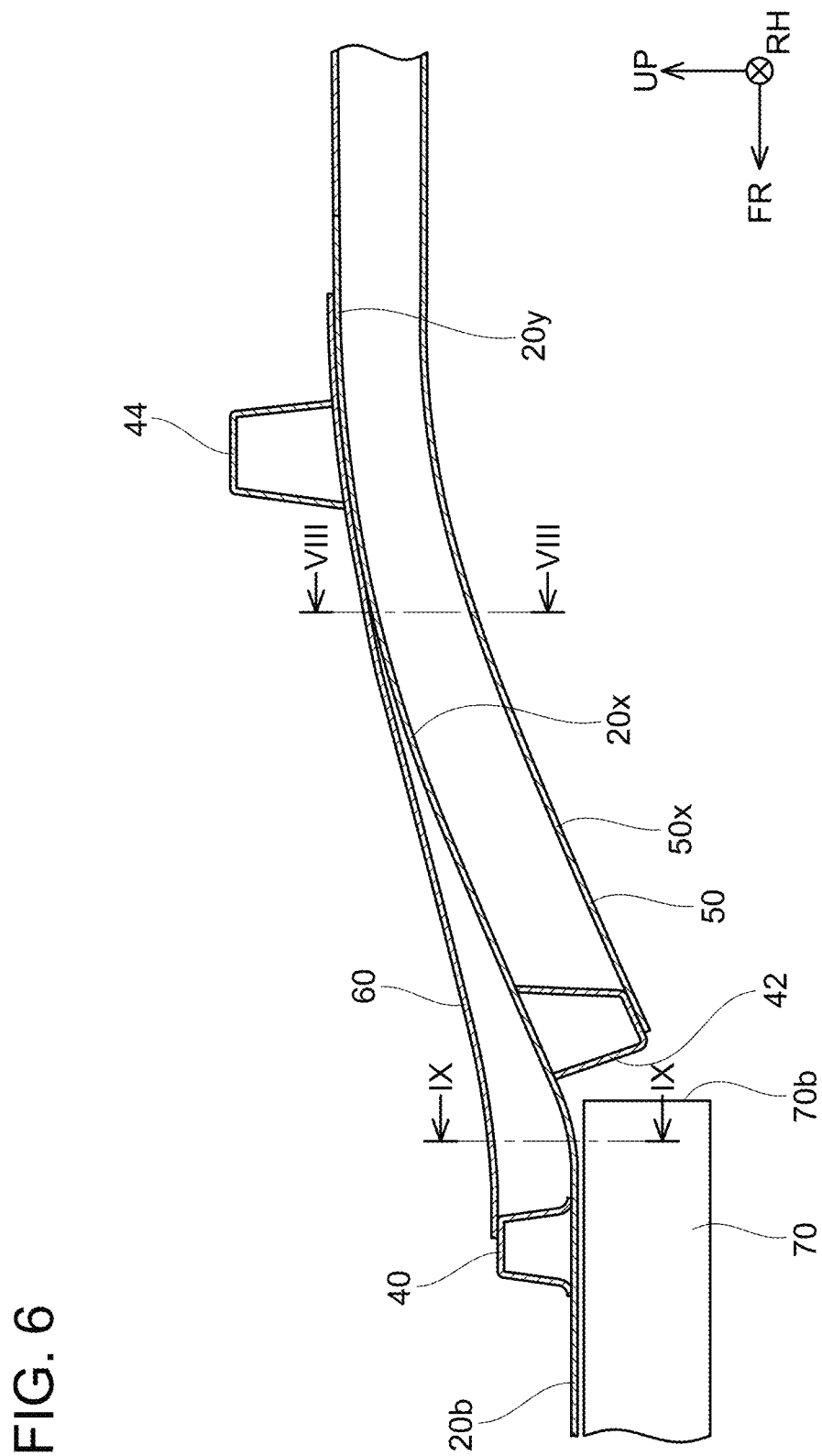
FIG. 6 is a cross-sectional view of the underbody along a line VI-VI in FIG. 2.

FIG. 5 is a perspective view of an area including the indoor floor crossmember 40 and the rear floor crossmember 44 from a right-front side. FIG. 6 is a cross-sectional view of the underbody along a line VI-VI in FIG. 2. As shown in FIGS. 5 and 6, the indoor floor crossmember 40 is a member having a beam shape and a U-shaped cross section. The indoor floor crossmember 40 is disposed to protrude upward from the rear floor panel 20b. The indoor floor crossmember 40 extends long in a right-left direction. As shown in FIGS. 2 and 3, the indoor floor crossmember 40 extends from the left rocker 30 to the right rocker 32. The indoor floor crossmember 40 is joined to the rear floor panel 20b, the left rocker 30, and the right rocker 32, for example, by welding.

As shown in FIGS. 5 and 6, the rear floor crossmember 44 is a member having a beam shape and a U-shaped cross section. The rear floor crossmember 44 is disposed to protrude upward from the rear floor panel 20b. The rear floor crossmember 44 extends long in the right-left direction. The rear floor crossmember 44 is located rearward of the indoor floor crossmember 40. As shown in FIGS. 2 and 3, the rear floor crossmember 44 extends from the left wheel house panel 34 to the right wheel house panel 36. The rear floor crossmember 44 is joined to the rear floor panel 20b, the left wheel house panel 34, and the right wheel house panel 36, for example, by welding.

Figure 7:
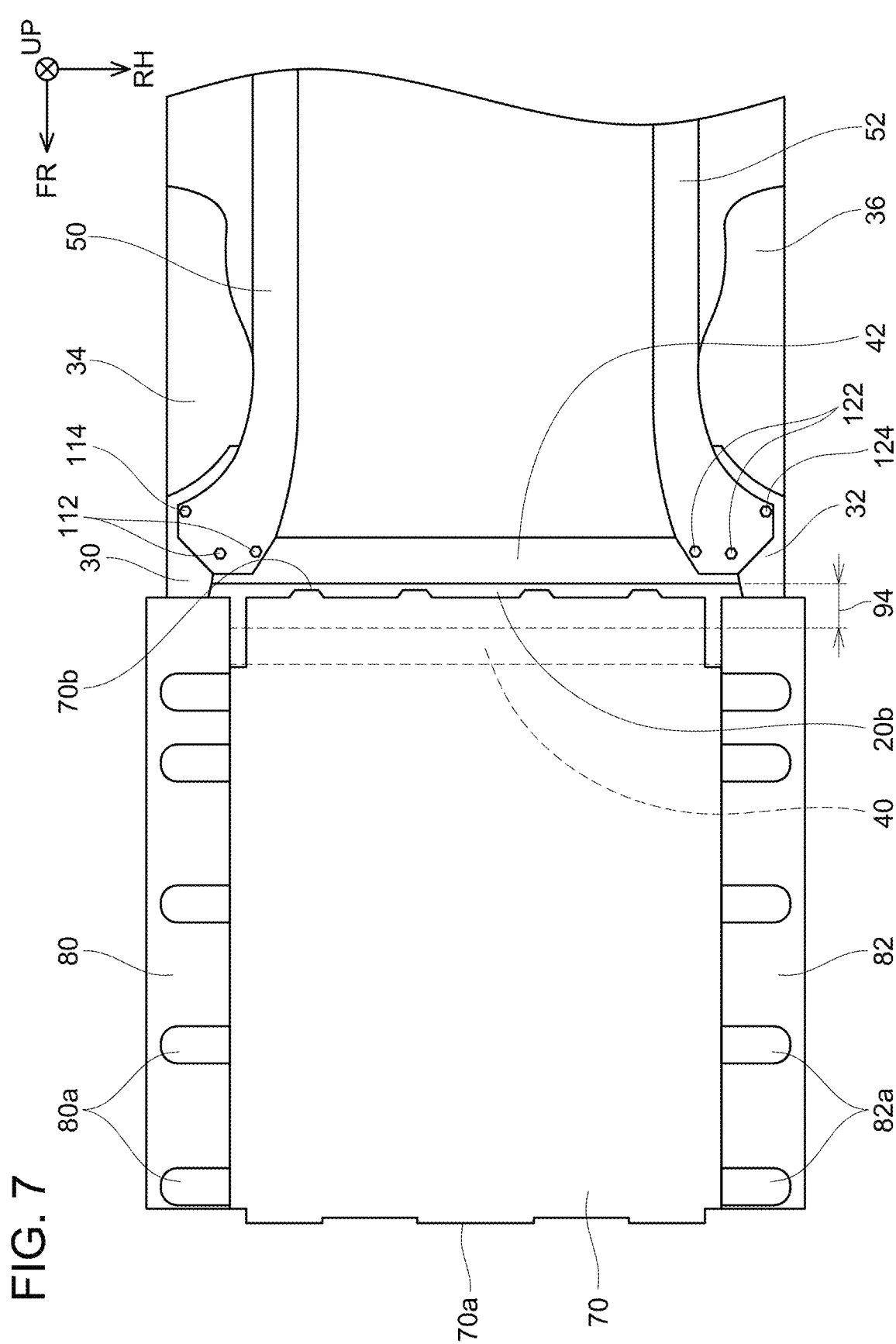
FIG. 7 is a planar view of the underbody from below.

As shown in FIGS. 6 and 7, an outdoor floor crossmember 42 is disposed on a lower surface of the rear floor panel 20b. The outdoor floor crossmember 42 is a member having a beam shape and a U-shaped cross section. The outdoor floor crossmember 42 is disposed to protrude downward from the rear floor panel 20b. The outdoor floor crossmember 42 extends long in the right-left direction. The outdoor floor crossmember 42 is located rearward of the indoor floor crossmember 40. The outdoor floor crossmember 42 is located frontward of the rear floor crossmember 44. The outdoor floor crossmember 42 extends from the left rocker 30 to the right rocker 32. The outdoor floor crossmember 42 is joined to the rear floor panel 20b, the left rocker 30, and the right rocker 32, for example, by welding.

As shown in FIG. 3, in the planar view of the underbody from above, the indoor floor crossmember 40, the outdoor floor crossmember 42, the left rocker 30, and the right rocker 32 constitute a substantially rectangular frame.

The rear floor panel 20b extends to a position frontward of the indoor floor crossmember 40 and also extends to a position rearward of the outdoor floor crossmember 42 and the rear floor crossmember 44. As shown in FIG. 6, a portion of the rear floor panel 20b that is located frontward of the indoor floor crossmember 40 extends horizontally. A portion of the rear floor panel 20b that is within a range located rearward of the indoor floor crossmember 40 and frontward of the rear floor crossmember 44 (especially, a range rearward of the outdoor floor crossmember 42) is inclined so as to shift upward toward a rear end of the vehicle. A portion of the rear floor panel 20b that is located rearward of the rear floor crossmember 44 extends horizontally. Hereinbelow, the portion of the rear floor panel 20b that is inclined so as to shift upward toward the rear end of the vehicle will be termed an inclined portion 20x, and the portion of the rear floor panel 20b that is located rearward of the inclined portion 20x and extends horizontally will be termed a horizontal portion 20y.

As shown in FIG. 7, a battery case 70 is disposed below the floor panel 20. The battery case 70 is a sealed container and houses a main battery. The main battery is configured to supply electric power to the traction motor. A pair of EA (Energy Absorption) members (a left EA member 80 and a right EA member 82) is disposed on left and right sides of the battery case 70, respectively. As shown in FIG. 4, the battery case 70 is fixed to the left rocker 30 and the right rocker 32 via the left EA member 80 and the right EA member 82, respectively.

As shown in FIG. 7, a front edge 70a of the battery case 70 is located near a front end of the cabin. As shown in FIGS. 6 and 7, a rear edge 70b of the battery case 70 is located within a range 94 that is located rearward of the indoor floor crossmember 40 and frontward of the outdoor floor crossmember 42. In other words, the battery case 70 extends from a position frontward of the indoor floor crossmember 40 to a position that is rearward of the indoor floor cross ember 40 and frontward of the outdoor floor crossmember 42.

Figure 8:
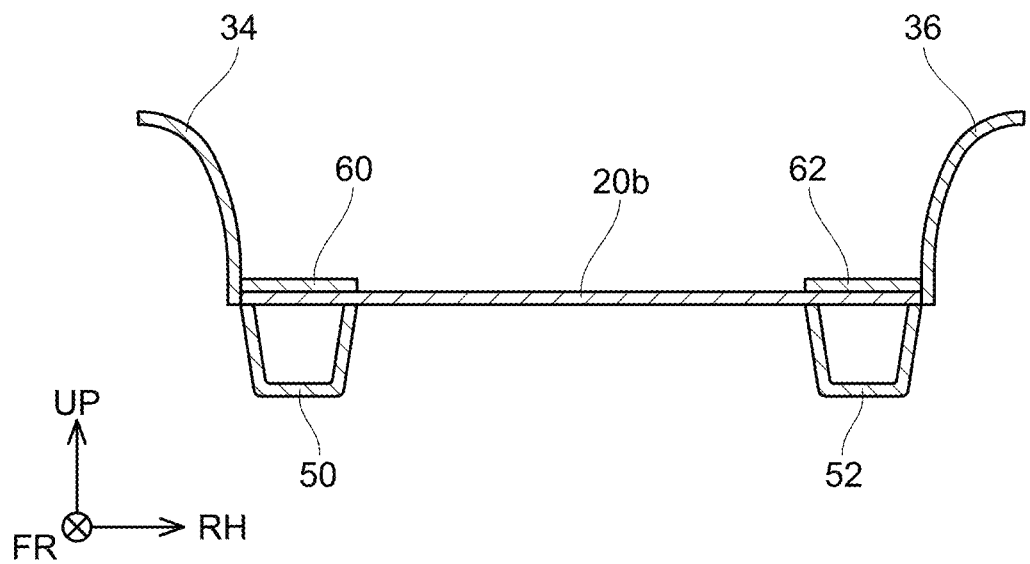
FIG. 8 is a cross-sectional view of the underbody along a line VIII-VIII in FIG. 2.

FIG. 8 shows a cross-sectional view of the underbody along a line VIII-VIII in FIGS. 2 and 6. As shown in FIG. 8, a pair of rear side members (a left rear side member 50 and a right rear side member 52) is disposed on the lower surface of the rear floor panel 20b. As shown in FIG. 8, the left rear side member 50 is an elongated member having a U-shaped cross section. The left rear side member 50 is disposed to protrude downward from the rear floor panel 20b. The left rear side member 50 extends long in the front-rear direction. As shown in FIGS. 6 and 7, the left rear side member 50 partially covers a lower surface of the outdoor floor crossmember 42 near a front end of the left rear side member 50. As shown in FIG. 7, the left rear side member 50 is jointed to the outdoor floor crossmember 42 by welding and a bolt 112. The left rear side member 50 partially covers a lower surface of the left rocker 30 near the front end of the left rear side member 50. The left rear side member 50 is joined to the left rocker 30 by welding and a bolt 114. As shown in FIGS. 3, 6, and 7, the left rear side member 50 extends rearward from the outdoor floor crossmember 42 along the left edge of the rear floor panel 20b. As shown in FIG. 6, below the inclined portion 20x of the rear floor panel 20b, the left rear side member 50 is inclined to shift upward toward the rear end of the vehicle along the inclined portion 20x. Hereinbelow, a portion of the left rear side member 50 that is inclined along the inclined portion 20x will be termed an inclined portion 50x. Although not shown, the left rear side member 50 extends up to a rearmost part of the vehicle and is connected to a rear bumper reinforcement at the rearmost part. As shown in FIG. 8, the right rear side member 52 is an elongated member having a U-shaped cross section. The right rear side member 52 is disposed to protrude downward from the rear floor panel 20b. The right rear side member 52 extends long in the front-rear direction. As shown in FIG. 7, the right rear side member 52 partially covers the lower surface of the outdoor floor crossmember 42 near a front end of the right rear side member 52. The right rear side member 52 is joined to the outdoor floor crossmember 42 by welding and a bolt 122. The right rear side member 52 partially covers a lower surface of the right rocker 32 near the front end of the right rear side member 52. The right rear side member 52 is joined to the right rocker 32 by welding and a bolt 124. As shown in FIGS. 3 and 7, the right rear side member 52 extends rearward from the outdoor floor crossmember 42 along the right edge of the rear floor panel 20b. Below the inclined portion 20x of the rear floor panel 20b, the right rear side member 52 is inclined to shift upward toward the rear end of the vehicle along the inclined portion 20x. Although not shown, the right rear side member 52 extends up to the rearmost part of the vehicle and is connected to the rear bumper reinforcement at the rearmost part of the vehicle.

As shown in FIG. 2. a pair of reinforcements (a left reinforcement 60 and a right reinforcement 62) is disposed above/on the rear floor panel 20b. The left reinforcement 60 is joined to the indoor floor crossmember 40, the rear floor panel 20b, the left rocker 30, and the left wheel house panel 34. The right reinforcement 62 is joined to the indoor floor crossmember 40, the rear floor panel 20b, the right rocker 32, and the right wheel house panel 36. The structure of the right reinforcement 62 is symmetric to that of the left reinforcement 60. Thus, detailed description for the structure of the right reinforcement 62 is omitted, and the structure of the left reinforcement 60 will be described in detail hereinbelow.

Figure 9:
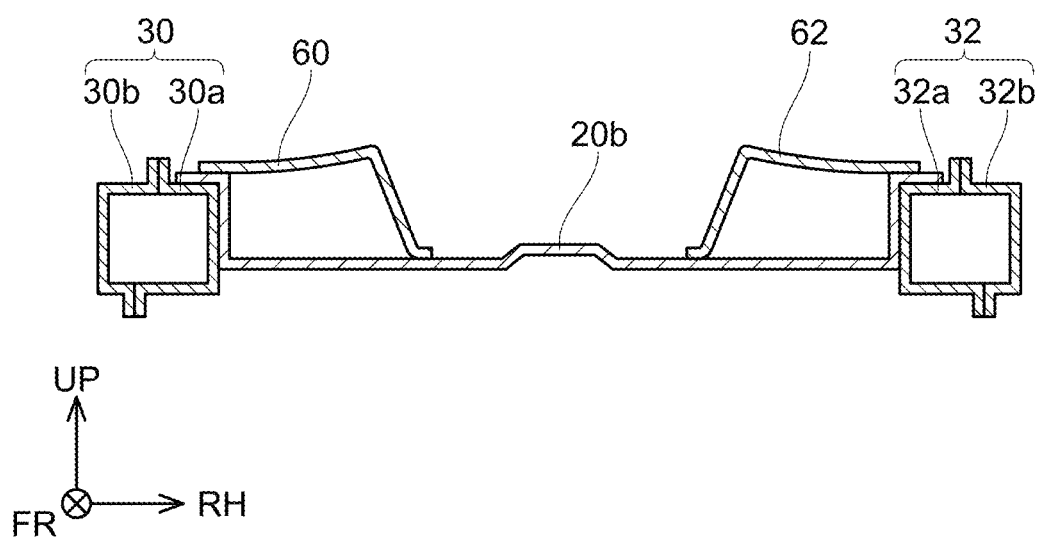
FIG. 9 is a cross-sectional view of the underbody along a line IX-IX in FIG. 2 (with a battery case 70 omitted).

FIG. 9 shows a cross-sectional view of a part of the underbody that includes the left reinforcement 60 (cut at a position of line IX-IX in FIG. 2). As shown in FIG. 9, the left reinforcement 60 is a cover-shaped member. The left reinforcement 60 is disposed to protrude upward from the rear floor panel 20b. As shown in FIG. 5, a front end of the left reinforcement 60 partially covers an upper surface of the indoor floor crossmember 40. The front end of the left reinforcement 60 is joined to the indoor floor crossmember 40, for example, by welding. The left reinforcement 60 extends rearward from the indoor floor crossmember 40 along the left edge of the rear floor panel 20b. Together with the rear floor panel 20b, the left reinforcement 60 is joined to the left rocker 30 and the left wheel house panel 34, for example, by welding. As shown in FIG. 6, a top plate of the left reinforcement 60 is inclined to shift upward toward the rear end of the vehicle along the inclined portion 20x of the rear floor panel 20b. The inclination angle of the top plate of the left reinforcement 60 is smaller than the inclination angle of the inclined portion 20x. Thus, in the vicinity of a rear end of the left reinforcement 60, the top plate of the left reinforcement 60 is in surface contact with the rear floor panel 20b. As shown in FIGS. 2 and 3, in the planar view of the rear floor panel 20b from above, the left reinforcement 60 is located to overlap the left rear side member 50. That is, the left reinforcement 60 is located above the left rear side member 50. The left reinforcement 60 is joined to the rear floor panel 20b at a position above the left rear side member 50, for example, by welding. As shown in FIG. 6, the rear end of the left reinforcement 60 is located rearward of the rear floor crossmember 44. The rear end of the left reinforcement 60 is located on the horizontal portion 20y of the rear floor panel 20b. At a position where the rear floor crossmember 44 overlaps the left reinforcement 60, the rear floor crossmember 44 covers the left reinforcement 60 from above. The left reinforcement 60 is joined to the rear floor panel 20b at a position rearward of the rear floor crossmember 44, for example, by welding.

As shown in FIG. 5, the left reinforcement 60 includes two high rigidity portions 60a, 60b and a low rigidity portion 60c. The top plate of the left reinforcement 60 is curved upward at the high rigidity portions 60a and 60b. Thus, the high rigidity portions 60a, 60b are high in rigidity. The high rigidity portions 60a, 60b extend long in the front-rear direction of the vehicle. The high rigidity portions 60a, 60b are arranged by being spaced apart from each other in the right-left direction of the vehicle. In the low rigidity portion 60c, the top plate of the left reinforcement 60 extends substantially horizontally. Further, the low rigidity portion 60c is provided with two through holes 60d. Thus, the low rigidity portion 60c is low in rigidity. The low rigidity portion 60c is less rigid than the high rigidity portions 60a, 60b. The low rigidity portion 60c is located between the high rigidity portions 60a and 60b.

Next, functions of the above-described body 10 will be described.

As described, in the body 10 of the embodiment, the outdoor floor crossmember 42 is located rearward of the indoor floor crossmember 40. Further, the battery case 70 extends from a position located forward of the indoor floor crossmember 40 to a position located rearward of the indoor floor crossmember 40 and forward of the outdoor floor crossmember 42 (i.e., to a position within the range 94 shown in FIG. 7). Arranging the outdoor floor crossmember 42 rearward of the indoor floor crossmember 40 allows the battery case 70 to extend into the range 94 and enables a size increase of the battery case 70. This enables an increased capacity of the main battery housed in the battery case 70.

Further, in the body 10 of the embodiment, the indoor floor crossmember 40 connects the left rocker 30 and the right rocker 32 to each other, and the outdoor floor crossmember 42 connects the left rocker 30 and the right rocker 32 to each other. In other words, the indoor floor crossmember 40 is directly joined to the left rocker 30 and the right rocker 32, and the outdoor floor crossmember 42 is directly joined to the left rocker 30 and the right rocker 32. The outdoor floor crossmember 42 is located rearward of the indoor floor crossmember 40. Thus, as shown in FIG. 3, in the planar view of the underbody from above, the indoor floor crossmember 40, the outdoor floor crossmember 42, the left rocker 30, and the right rocker 32 constitute a substantially rectangular frame. This frame is highly rigid. Thus, in the event of a lateral collision to the vehicle, deformation of the left rocker 30 and the right rocker 32 is mitigated. As shown in FIG. 7, the battery case 70 is located between the left rocker 30 and the right rocker 32. Since the left rocker 30 and the right rocker 32 are less likely to be deformed in the event of a lateral collision to the vehicle, a load applied to the battery case 70 is mitigated. Thus, the battery can be suitably protected.

Further, in the body 10 of the embodiment, the left reinforcement 60 is disposed above the left rear side member 50. The front end of the left rear side member 50 is joined to the outdoor floor crossmember 42. The left reinforcement 60 is joined to the indoor floor crossmember 40 and is also joined to the rear floor panel 20b above the left rear side member 50. In this configuration, the left rear side member 50 is reinforced by the left reinforcement 60. Thus, deformation of the left rear side member 50 is mitigated when a rear-collision occurs to the vehicle. Further, at the inclined portion 50x, the left rear side member 50 is inclined to shift upward toward the rear end of the vehicle. Thus, a rear end of the left rear side member 50 is located above a portion of the rear floor panel 20b that is located frontward of the outdoor floor crossmember 42. Thus, when a rear-collision occurs to the vehicle, a moment load is applied to the portion of the rear floor panel 20b that is located frontward of the outdoor floor crossmember 42. Since the left reinforcement 60 is joined to the indoor floor crossmember 40 and is also joined to the rear floor panel 20b at a position rearward of the outdoor floor crossmember 42, the moment load applied to the portion of the rear floor panel 20b that is located frontward of the outdoor floor crossmember 42 can be reduced. In particular, since the left reinforcement 60 is joined to the upper surface of the indoor floor crossmember 40 which is located above the rear floor panel 20b, a height difference between a collision point (the rear end of the left rear side member 50) and a support point (the front end of the left reinforcement 60) is small, which efficiently reduces the moment load. The moment load can be reduced also by the right rear side member 52 and the right reinforcement 62, in the same manner.

Further, in the body 10 of the embodiment, the left reinforcement 60 includes the high rigidity portions 60a, 60b. Thus, the left reinforcement 60 is highly rigid and can suitably reinforce the left rear side member 50. Further, the low rigidity portion 60c is disposed between the high rigidity portions 60a and 60b. Thus, when a rear-end collision occurs to the vehicle, application of an excessive load onto the joint site between the left reinforcement 60 and the indoor floor crossmember 40 is suppressed. This prevents the indoor floor crossmember 40 from being excessively deformed. Since the right reinforcement 62 has a similar structure, similar effects can be obtained.

Further, in the body 10 of the embodiment, the left reinforcement 60 extends to a position rearward of the rear floor crossmember 44 and extends to a position above the horizontal portion 20y. Arranging the left reinforcement 60 to extend up to the rear part of the vehicle enables the left reinforcement 60 to more efficiently reinforce the left rear side member 50. Further, joining the left reinforcement 60 to the left wheel house panel 34 enhances this reinforcement effect. Since the right reinforcement 62 has a similar structure, the right reinforcement 62 can also efficiently reinforce the right rear side member 52.

Some of the technical elements disclosed herein will be listed below. It should be noted that the respective technical elements are independent of one another, and are useful solely or in combinations.

In an aspect of the body disclosed herein, the body may further comprise a rear side member and a reinforcement. The rear side member may protrude downward from the floor panel, be joined to the outdoor floor crossmember, and extend rearward from the outdoor floor crossmember along one of the side edges of the floor panel. The reinforcement may be joined to the indoor floor crossmember, extend from the indoor floor crossmember to a position above the rear side member, and be joined to the floor panel at the position above the rear side member.

This configuration enables the reinforcement to reinforce the rear side member. Thus, collision durability of the vehicle against a rear-end collision can be improved.

In an aspect of the body disclosed herein, the reinforcement may comprise a plurality of high rigidity portions which is arranged along a right-left direction at intervals and extends along a front-rear direction, and a low rigidity portion located between the high rigidity portions.

This configuration can ensure the rigidity of the reinforcement and prevent an excessively high load from being applied onto the indoor floor crossmember in the event of a rear-end collision to the vehicle.

In an aspect of the body disclosed herein, the floor panel may comprise a first inclined portion that extends so as to shift upward toward a rear end of the electric vehicle in a range rearward of the outdoor floor crossmember. The rear side member may comprise a second inclined portion that extends so as to shift upward toward the rear end of the electric vehicle along the first inclined portion.

In this configuration, the reinforcement reduces a moment load that is applied to the floor panel through the rear side member in the event of a rear-end collision to the vehicle.

In an aspect of body disclosed herein, the floor panel may further comprise a horizontal portion located rearward of the first inclined portion and extending horizontally. The reinforcement may extend to a position above the horizontal portion.

In an aspect of body disclosed herein, the body may further comprise a rear wheel house panel and a rear floor crossmember. The rear wheel house panel may be located rearward of the outdoor floor crossmember and be joined to one of the side edges of the floor panel. The rear floor crossmember may protrude upward from the floor panel, extend along the right-left direction, and be joined to the rear wheel house panel. The reinforcement may extend to a position rearward of the rear floor cross member. In this case, the reinforcement may be connected to the rear wheel house panel.

Arranging the reinforcement to extend up to a rear part of the vehicle as in these configurations enables the reinforcement to more efficiently reinforce the rear side member.

While specific examples of the present disclosure have been described above in detail, these examples are merely illustrative and place no limitation on the scope of the patent claims. The technology described in the patent claims also encompasses various changes and modifications to the specific examples described above. The technical elements explained in the present description or drawings provide technical utility either independently or through various combinations. The present disclosure is not limited to the combinations described at the time the claims are filed.

Further, the purpose of the examples illustrated by the present description or drawings is to satisfy multiple objectives simultaneously, and satisfying any one of those objectives gives technical utility to the present disclosure.

What is claimed is:

1. A body of an electric vehicle, comprising:
a floor panel;
a pair of rockers extending along both side edges of the floor panel, respectively;
an indoor floor crossmember protruding upward from the floor panel and connecting the rockers to each other;
an outdoor floor crossmember protruding downward from the floor panel, wherein the outdoor floor crossmember directly connects to each of the rockers, and is located rearward of the indoor floor crossmember; and
a battery case located below the floor panel and housing a battery configured to supply power to a traction motor,
wherein
the battery case extends from a position located frontward of the indoor floor crossmember to a position that is located rearward of the indoor floor crossmember and frontward of the outdoor floor crossmember.

2. The body of claim 1, further comprising:
a rear side member protruding downward from the floor panel, joined to the outdoor floor crossmember, and extending rearward from the outdoor floor crossmember along one of the side edges of the floor panel; and
a reinforcement joined to the indoor floor crossmember, extending from the indoor floor crossmember to a position above the rear side member, and joined to the floor panel at the position above the rear side member.

3. The body of claim 2, wherein
the reinforcement comprises:
a plurality of high rigidity portions arranged along a right-left direction at intervals and extending along a front-rear direction; and
a low rigidity portion located between the high rigidity portions.

4. The body of claim 2, wherein
the floor panel comprises a first inclined portion, the first inclined portion extending so as to shift upward toward a rear end of the electric vehicle in a range rearward of the outdoor floor crossmember, and
the rear side member comprises a second inclined portion, the second inclined portion extending so as to shift upward toward the rear end of the electric vehicle along the first inclined portion.

5. The body of claim 4, wherein
the floor panel further comprises a horizontal portion located rearward of the first inclined portion and extending horizontally, and
the reinforcement extends to a position above the horizontal portion.

6. The body of claim 2, further comprising:
a rear wheel house panel located rearward of the outdoor floor crossmember and joined to one of the side edges of the floor panel; and
a rear floor crossmember protruding upward from the floor panel, extending along the left-right direction, and joined to the rear wheel house panel,
wherein the reinforcement extends to a position rearward of the rear floor crossmember.

7. The body of claim 6, wherein the reinforcement is joined to the rear wheel house panel.

* * * * *